US010610903B2

(12) United States Patent
Magony (10) Patent No.: US 10,610,903 B2
(45) Date of Patent: Apr. 7, 2020

(54) METHOD FOR OPERATING A DIRT STOP SURFACE, DIRT STOP SURFACE UNIT AND DIRT STOP SURFACE ASSEMBLED THEREFROM

(76) Inventor: Richard Magony, Pecs (HU)

(*) Notice: Subject to any disclaimer, the term of this patent is extended or adjusted under 35 U.S.C. 154(b) by 410 days.

(21) Appl. No.: 13/989,779

(22) PCT Filed: Nov. 25, 2011

(86) PCT No.: PCT/HU2011/000110
§ 371 (c)(1),
(2), (4) Date: May 24, 2013

(87) PCT Pub. No.: WO2012/069860
PCT Pub. Date: May 31, 2012

(65) Prior Publication Data
US 2013/0255727 A1 Oct. 3, 2013

(30) Foreign Application Priority Data
Nov. 26, 2010 (HU) .................................. 1000636

(51) Int. Cl.
*B08B 3/04* (2006.01)
*B60S 3/04* (2006.01)
*A47L 23/22* (2006.01)

(52) U.S. Cl.
CPC ............... *B08B 3/04* (2013.01); *A47L 23/22* (2013.01); *B60S 3/042* (2013.01)

(58) Field of Classification Search
CPC ........ A47L 23/22; A47L 23/26; A47L 23/263; A47L 23/266; B60S 3/042
See application file for complete search history.

(56) References Cited

U.S. PATENT DOCUMENTS

| 2,989,965 | A | * | 6/1961 | Rod | A47L 23/263 |
| | | | | | 134/1 |
| 3,424,354 | A | * | 1/1969 | Dykinga | B65D 83/20 |
| | | | | | 222/402.14 |
| 3,696,459 | A | * | 10/1972 | Kucera | A47L 23/266 |
| | | | | | 15/104.92 |
| 3,806,037 | A | * | 4/1974 | Loewenkamp | B05B 7/32 |
| | | | | | 137/115.13 |

(Continued)

FOREIGN PATENT DOCUMENTS

CN 86204423 U * 12/1987
CN 2232719 Y * 8/1996

(Continued)

OTHER PUBLICATIONS 201180066131.4 SIPO action, Dec. 17, 2015, SIPO, 6 pages.*

(Continued)

*Primary Examiner* — Mikhail Kornakov
*Assistant Examiner* — Natasha N Campbell
(74) *Attorney, Agent, or Firm* — Louis Ventre, Jr.

(57) ABSTRACT

The invention relates to a method for cleaning of indoor or outdoor areas by operating a dirt stop surface, comprising the steps of dividing the dirt stop surface (1) into surface units (4), dispensing a fluid flow on the surface to be cleaned, while the proximity of the surface to be cleaned is sensed separately for each surface unit (4), and the fluid is dispensed from the surface units (4) of the dirt stop surface in a selective manner such that only the surface units (4) in the proximity of which the presence of the surface to be cleaned has been sensed are applied for dispensing the fluid. The invention relates further to a dirt stop surface unit and a dirt stop surface assembled therefrom that is capable of carrying out the method.

8 Claims, 12 Drawing Sheets

(56) References Cited

U.S. PATENT DOCUMENTS

| | | | | |
|---|---|---|---|---|
| 3,915,179 | A * | 10/1975 | Casson | B60S 3/042 134/45 |
| 4,004,854 | A * | 1/1977 | Breer, II | A47L 13/26 222/214 |
| 4,353,944 | A * | 10/1982 | Tarui | A47L 23/26 15/217 |
| 5,255,695 | A * | 10/1993 | Downey | B60S 3/04 134/123 |
| 5,950,269 | A * | 9/1999 | Openshaw | A46B 13/001 15/34 |
| 6,105,201 | A * | 8/2000 | Min | A47L 23/263 15/302 |
| 6,561,201 | B1 | 5/2003 | Midkiff | |
| 2005/0229808 | A1* | 10/2005 | MacDowell | B60S 3/04 105/157.1 |
| 2007/0271715 | A1* | 11/2007 | Scoralle | A47L 23/22 15/104.92 |
| 2012/0066847 | A1* | 3/2012 | Bai | A47L 23/02 15/4 |
| 2012/0167338 | A1* | 7/2012 | Williams | A47L 23/263 15/380 |

FOREIGN PATENT DOCUMENTS

| | | | |
|---|---|---|---|
| CN | 1875876 A | * | 12/2006 |
| DE | 1703488 A1 | | 1/1972 |
| DE | WO2010010160 A1 | | 1/2010 |
| FR | WO0062823 A1 | | 10/2000 |

OTHER PUBLICATIONS

Hinchliffe, how to wash your car, May 4, 2010, carsguide, 2 pages.*

Placer County, carwashing, Aug. 22, 2007, Placer County California,date stamp, tittle, and paragraph including discussion of treating and recycling.*

Vocabulary.com, Valve, May 10, 2018, Vocabulary.com, definition of valve.*

Machine translation of CN86204423; Zou, S. (Year: 1987).*

European Patent Office, International Search Report, Authorized Officer Paul Westland, EPO, P.B. 5818 Palentlaan 2, NL—2280 HV Rijswijk, dated Apr. 2, 2012, NL.

* cited by examiner

METHOD FOR OPERATING A DIRT STOP SURFACE, DIRT STOP SURFACE UNIT AND DIRT STOP SURFACE ASSEMBLED THEREFROM

The invention relates to a method for cleaning of indoor or outdoor areas by operating a dirt stop surface, and also to a dirt stop surface unit and a dirt stop surface assembled therefrom that is capable of carrying out the method.

Cleanliness of areas is usually provided by cleaning, which involves continuous or regular removal of contaminants and dirt. However, cleaning is uneconomical when no contamination is present, and economical cleaning may result in unacceptable levels of contamination, necessitating a compromise between the frequency of cleaning and the level of contamination that will vary in time and space but will not be reduced to zero.

Compared to cleaning an area, it is less expensive and way easier to capture contaminants before they could enter the area to be kept clean, usually directly at the entryways for people and goods traffic.

70-80 percent of contaminants are carried in buildings on the shoes of people entering them. Contaminants first accumulate on the ground, but dust and other contaminants may eventually accumulate everywhere, making cleaning a troublesome and costly undertaking (see "Tiszta Tér Technológia" Épülettisztítási Szakmagazin, http://tisztatertechnologia.hu)

Therefore, especially at building entrances having heavy traffic, dirt stop mat systems are applied, such as for instance the products belonging to the Nomad™ dirt stop product family made by 3M. Dirt stop solutions for vehicle traffic areas utilising brush devices are also known. Such a solution is disclosed for instance in the document EP 2240066 (A2). However, these mechanical devices themselves require regular cleaning since, depending on the load of traffic, they become saturated sooner or later, which deteriorates cleaning efficiency in case accumulated dirt or dust are not removed. Known solutions for cleaning the wheels and tires of vehicles include for instance a device described in the document U.S. Pat. No. 6,561,201 that contains an elongated tank and water sprays directed to the wheels (in a manner similar to car wash devices). The applicability of such solutions may be limited by their large space demand and also by the relatively large water amount that is carried off by the vehicle leaving the apparatus. Another known solution for preventing contaminants from being carried into areas to be kept clean is a disposable sticky mat applied among others at doors of clean rooms (see e.g. www.stickystep.com). To provide sustained cleaning capability, the topmost sheet has to be removed by pulling it off from the multi-sheet mat when the sheet becomes saturated with contaminants.

The objective of the present invention is to provide a method and apparatus for preventing contaminants from entering an area to be kept clean that quickly and effectively cleans contaminating surfaces (wheels, shoe soles) of people and vehicles crossing the line dividing clean and contaminated areas without disturbing pedestrian or motorised traffic. A further objective of the invention is to provide a high-efficiency cleaning method and apparatus based on the principle of preventive action that may be adapted for many different fields of application such that it may prevent the spreading of contamination and reduce the need for subsequent cleaning, and that may be operated in a sustained and economical manner without human attendance in case of heavy or varying intensity traffic. The inventive apparatus should be low maintenance, should have self-cleaning capability, aesthetic appearance, and long operating life. It should be capable of operation both indoors and outdoors under diverse weather and environmental conditions (in dry, humid, wet, or freezing and snowy weather as well as in dusty, dirty, greasy, sticky, chemical-loaded environments). The method and apparatus should be capable of operation in a wide temperature range, and should also allow the application of chemical agents, detergents, disinfectants and perfumes.

The invention is based on the recognition that by producing an active dirt stop surface, particularly one dispensing a cleaning fluid that operates only at the time and location of its contact with the surface to be cleaned it is possible to create a cleaning machine that cleans in a preventive manner, before contamination would occur.

The inventive solution is defined in the independent claims, while the preferred embodiments are described in the dependent claims.

The invention will be explained below with reference to the accompanying drawings, where FIG. 1. illustrates the most frequently occurring contact surface types, such as the surfaces of vehicle wheels and shoe soles contacting the ground.

Figure 1:
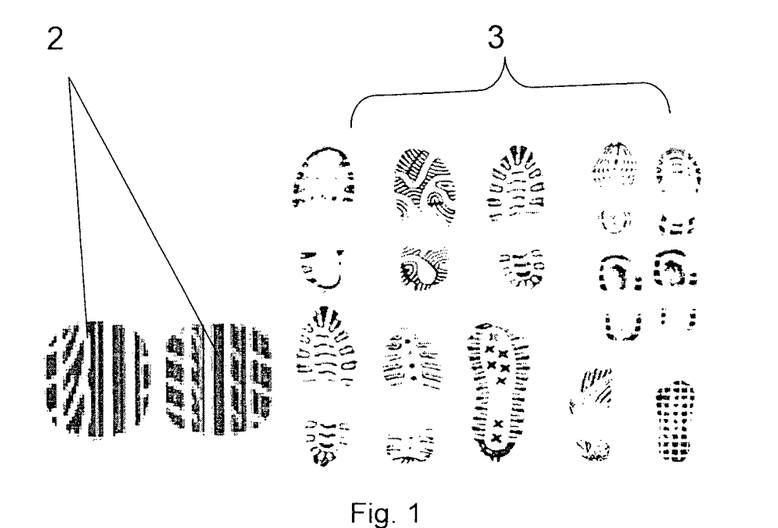
Figure 2:
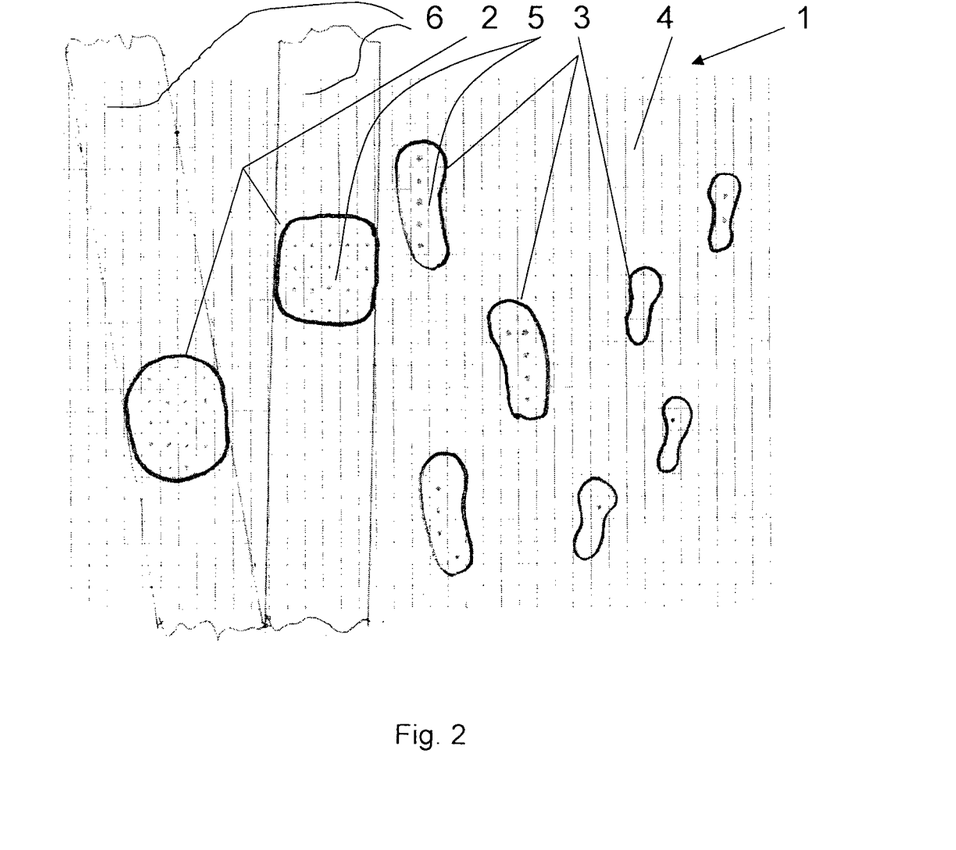
FIG. 2 shows the schematic view of the surfaces to be cleaned in relation to a dirt stop surface divided into surface units.

According to the present invention the dirt stop surface 1 is divided into surface units 4 that are able to sense the presence of a surface to be cleaned, such as the contact surface of a vehicle wheel 2 or a shoe sole 3, in their proximity, with the dirt stop surface 1 performing cleaning action by dispensing cleaning fluid on the surfaces to be cleaned from those surface units that are substantially fully covered by the surfaces to be cleaned. The smaller the size of individual surface units, the better the outline of the surface to be cleaned may be traced, and thus the better the "resolution" of the "mapping" becomes. For the sake of clarity in FIG. 2 the "activated" surface units 4 (indicated by dots) that are performing cleaning action on wheel and shoe sole surfaces are shown exaggerated in size. Since the dirt stop surface 1 according to the present invention expediently has uniform cleaning efficiency over the entirety of the surface, the path of wheels 6 or pedestrians may lead to any direction. In principle, any known solution may be applied for sensing the presence of the surface to be cleaned, and also many different solutions may be applicable for selectively dispensing the cleaning fluid. To show the specific advantages of the inventive solution, details of the present invention are explained in relation to a preferred embodiment that utilises mechanical means for proximity sensing.

Figure 3:
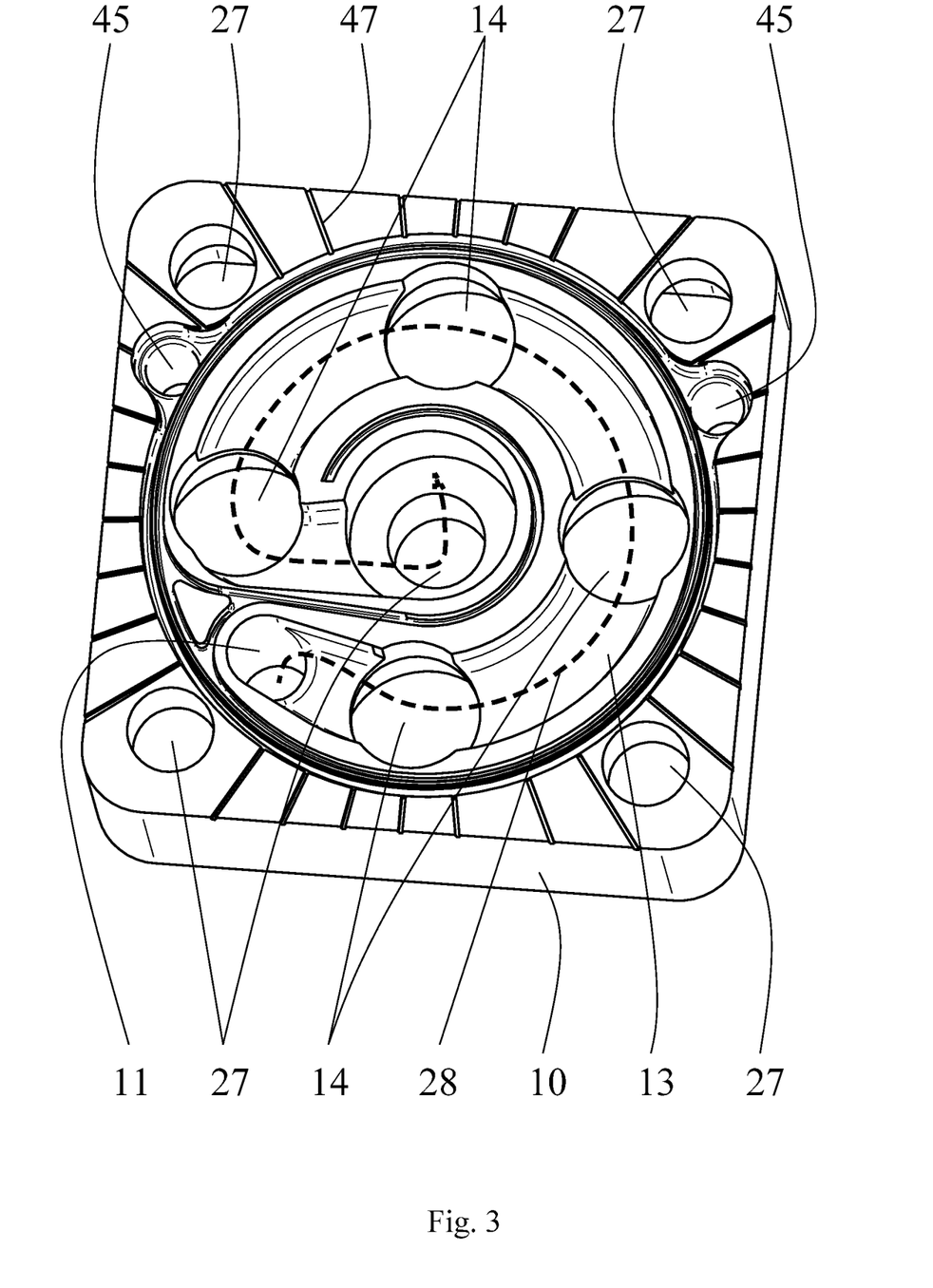
FIG. 3 shows the spatial view of the base body of a surface unit of the dirt stop surface from above.
Figure 4:
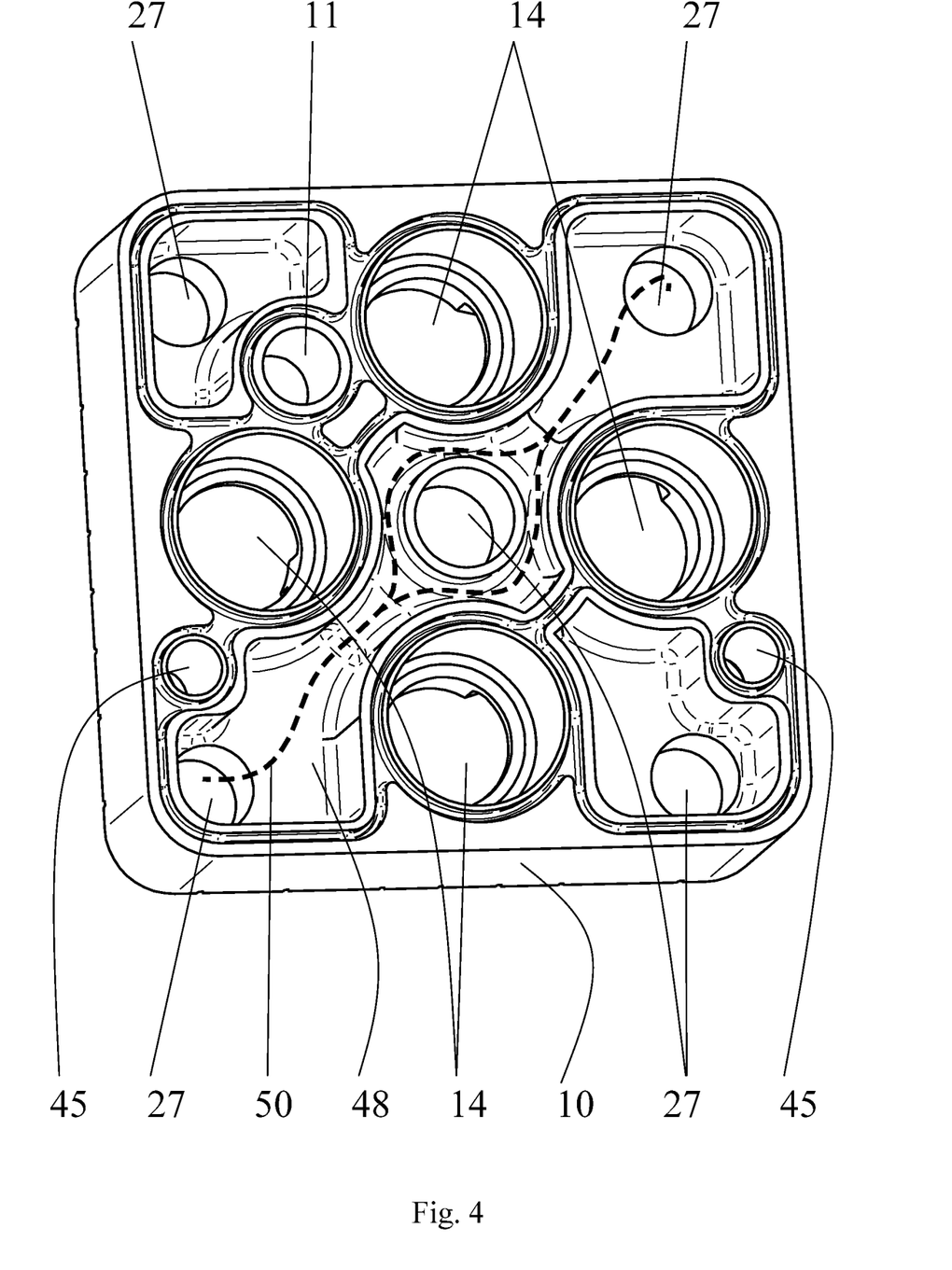
FIG. 4 is the spatial view of the base body of FIG. 3 shown from below.
Figure 5:
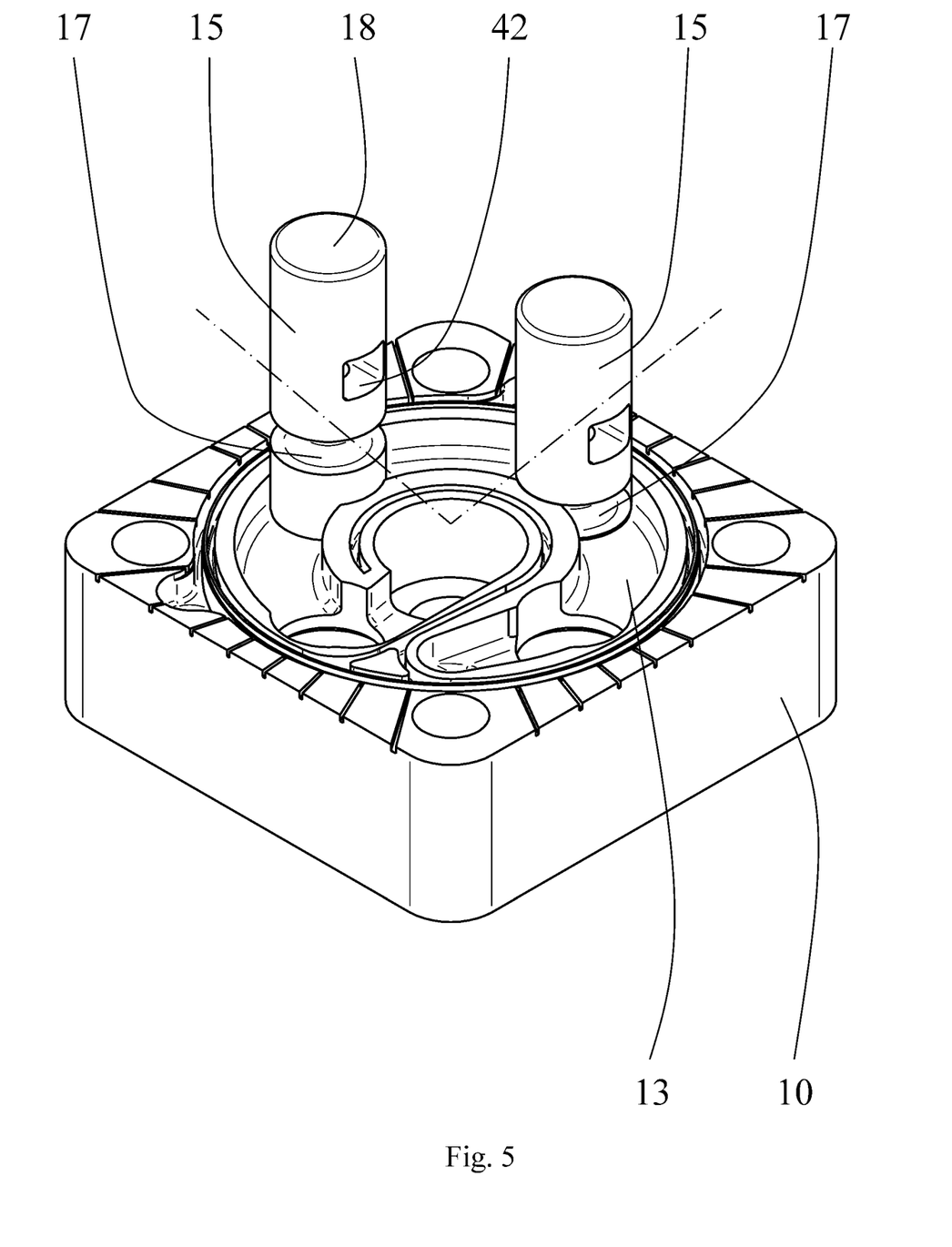
FIG. 5 is the detail view of the base body according to FIG. 3 showing the valves.
Figure 6:
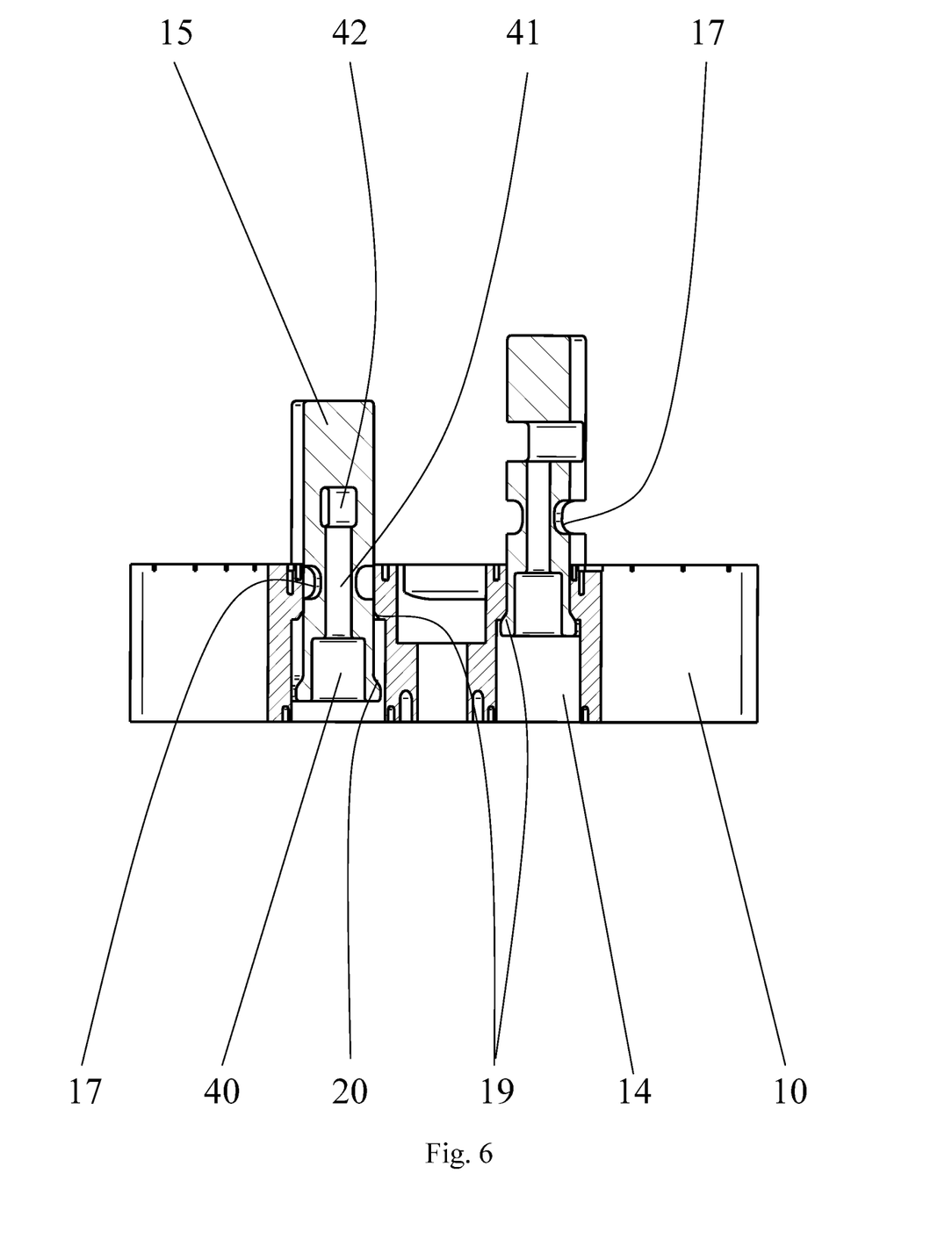
FIG. 6 is the lateral sectional view of the base body shown in FIG. 5.
Figure 7:
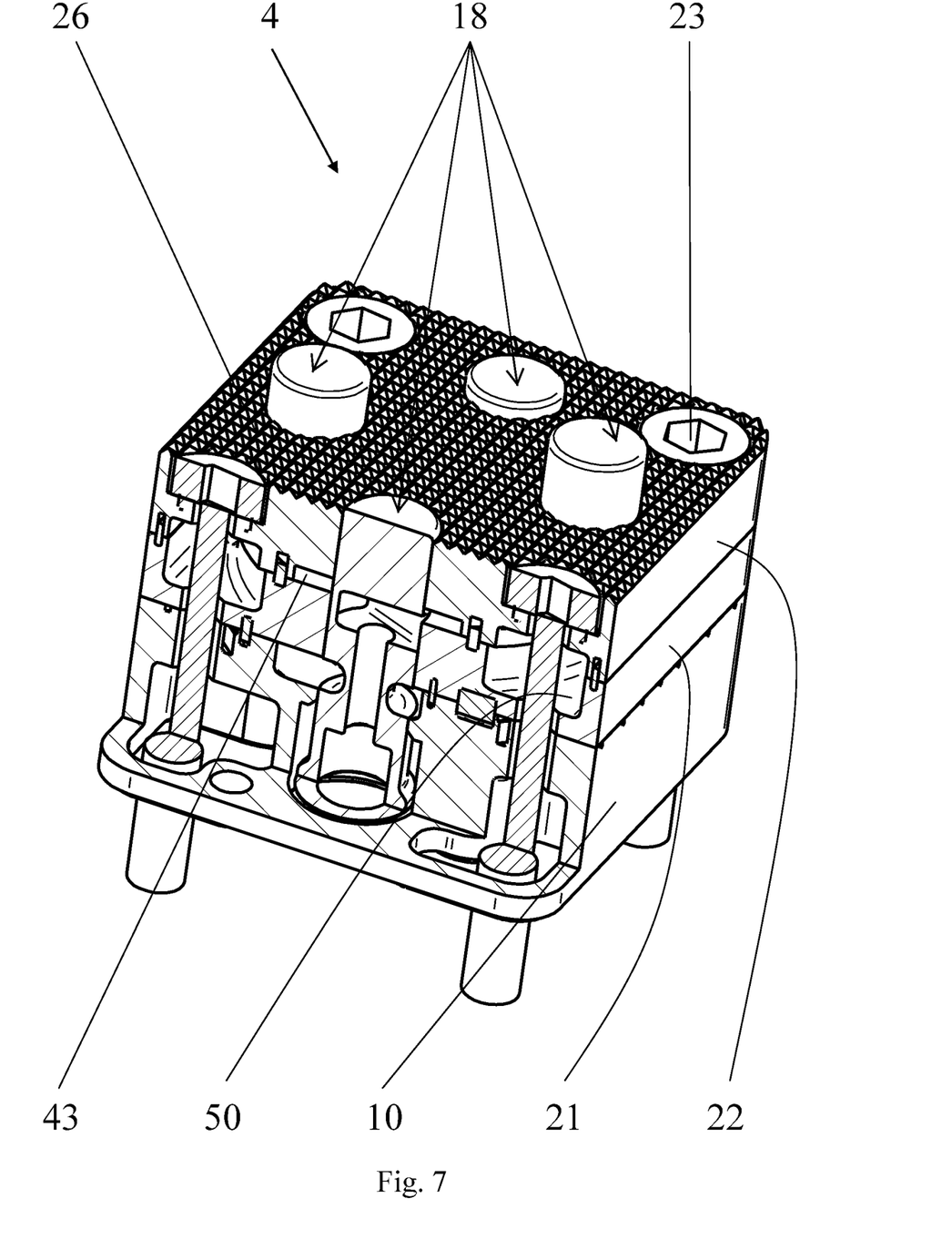
FIG. 7 shows the partially sectioned spatial view of an assembled valve unit from above.
Figure 9:
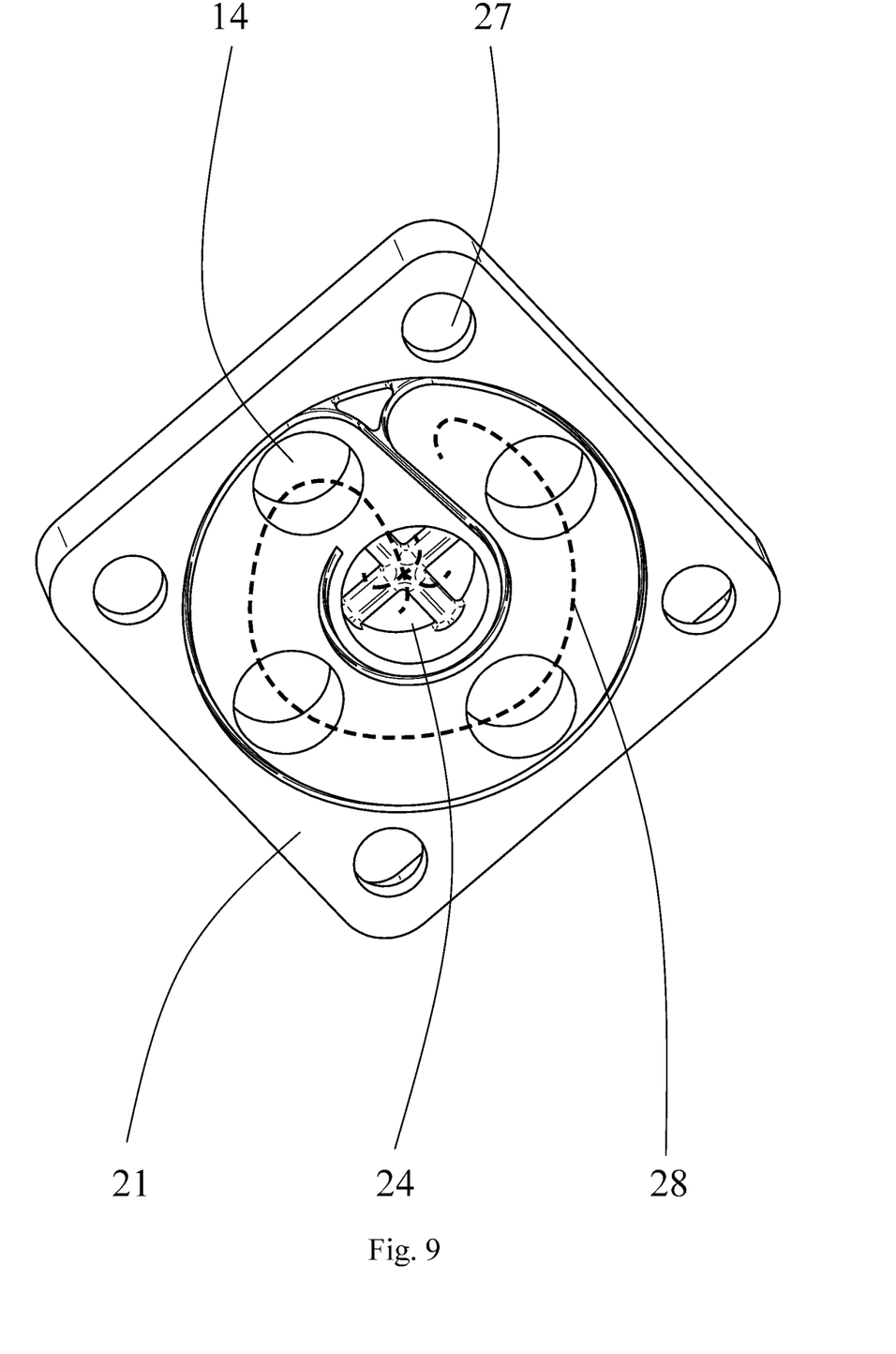
FIG. 9 is the spatial view of the intermediate body of FIG. 8 shown from below.
Figure 10:
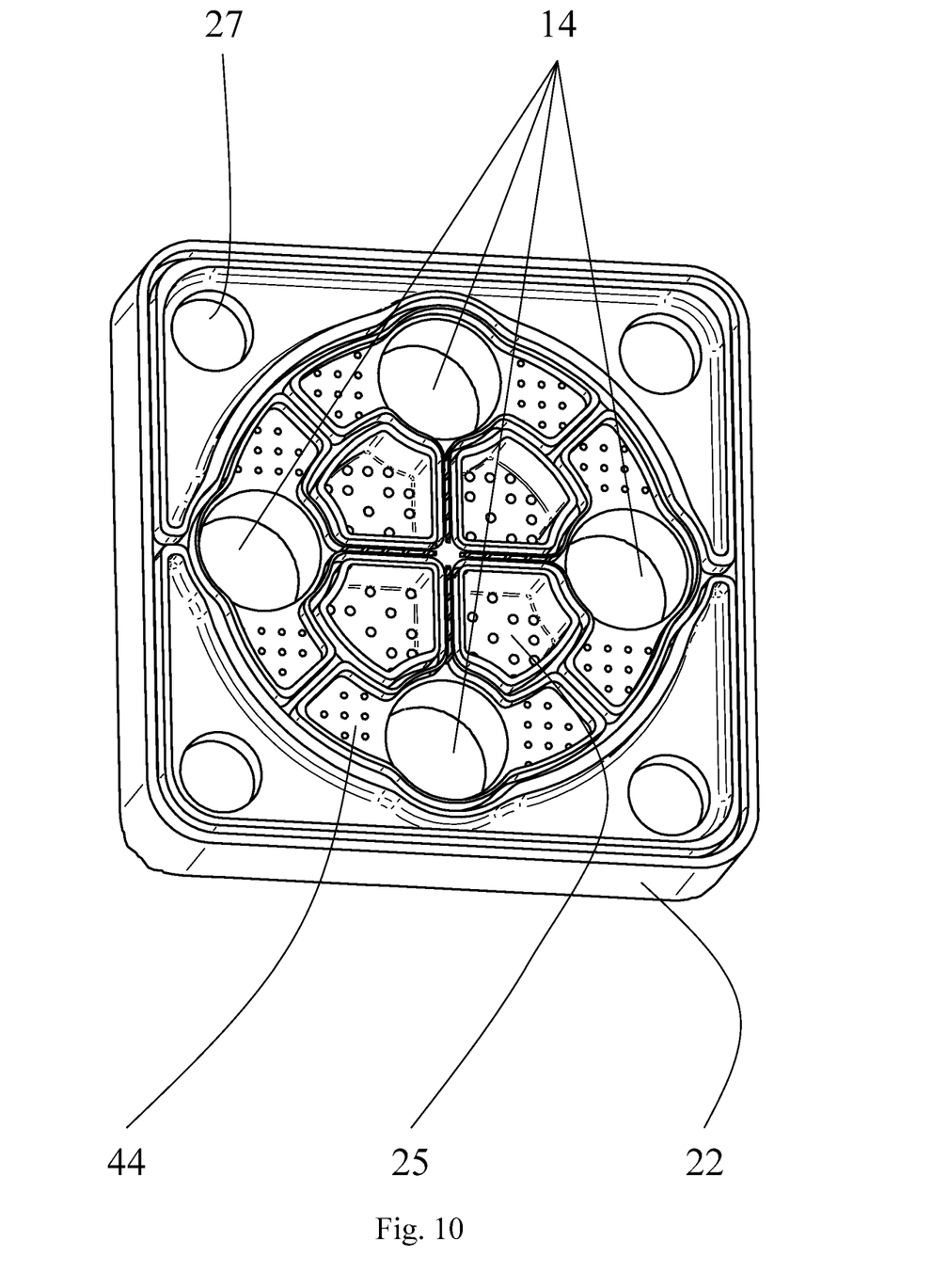
FIG. 10 is the spatial view of the upper body of a surface unit shown from below.
Figure 11:
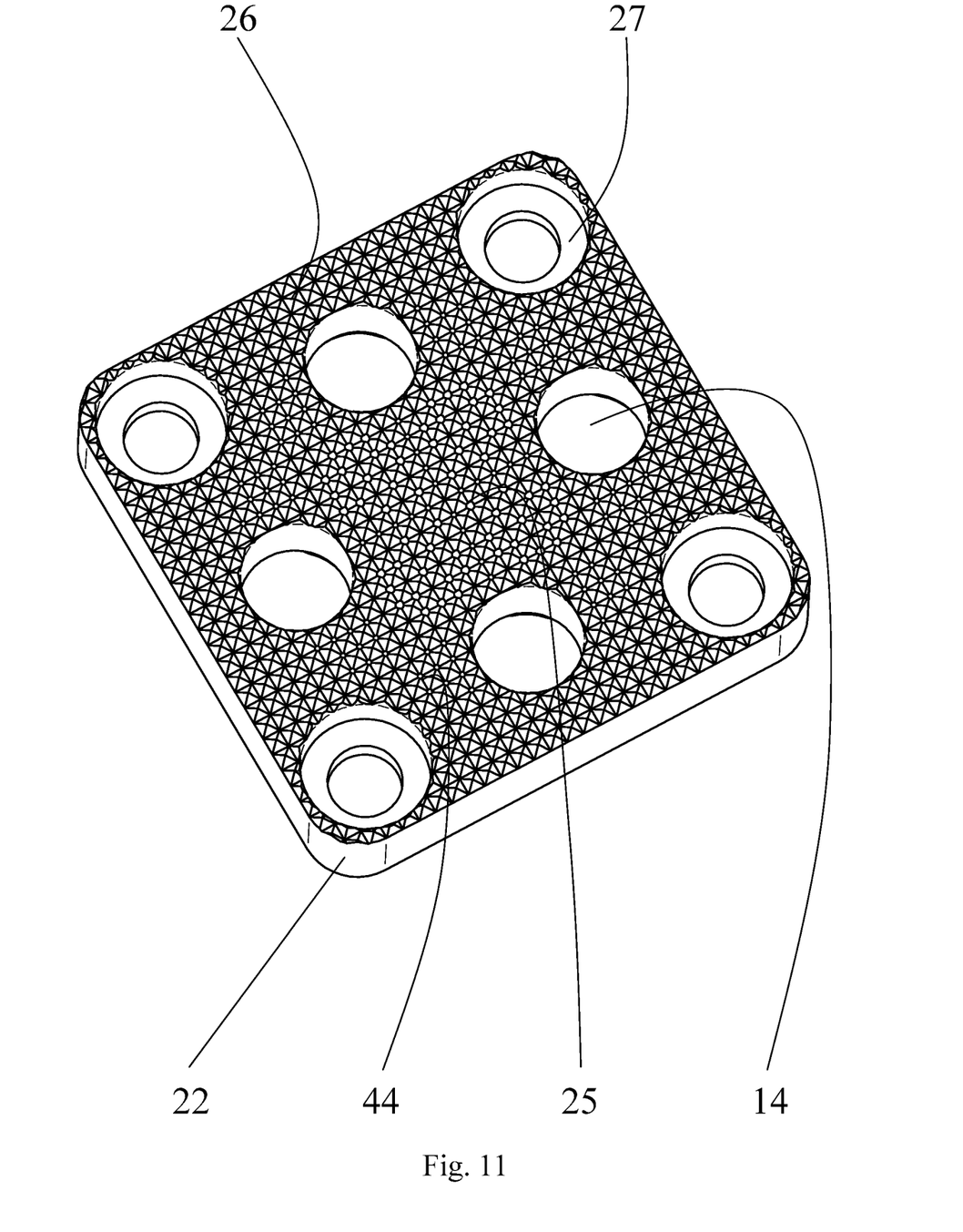
FIG. 11 is the spatial view of the upper body of FIG. 8 shown from above.
Figure 12:
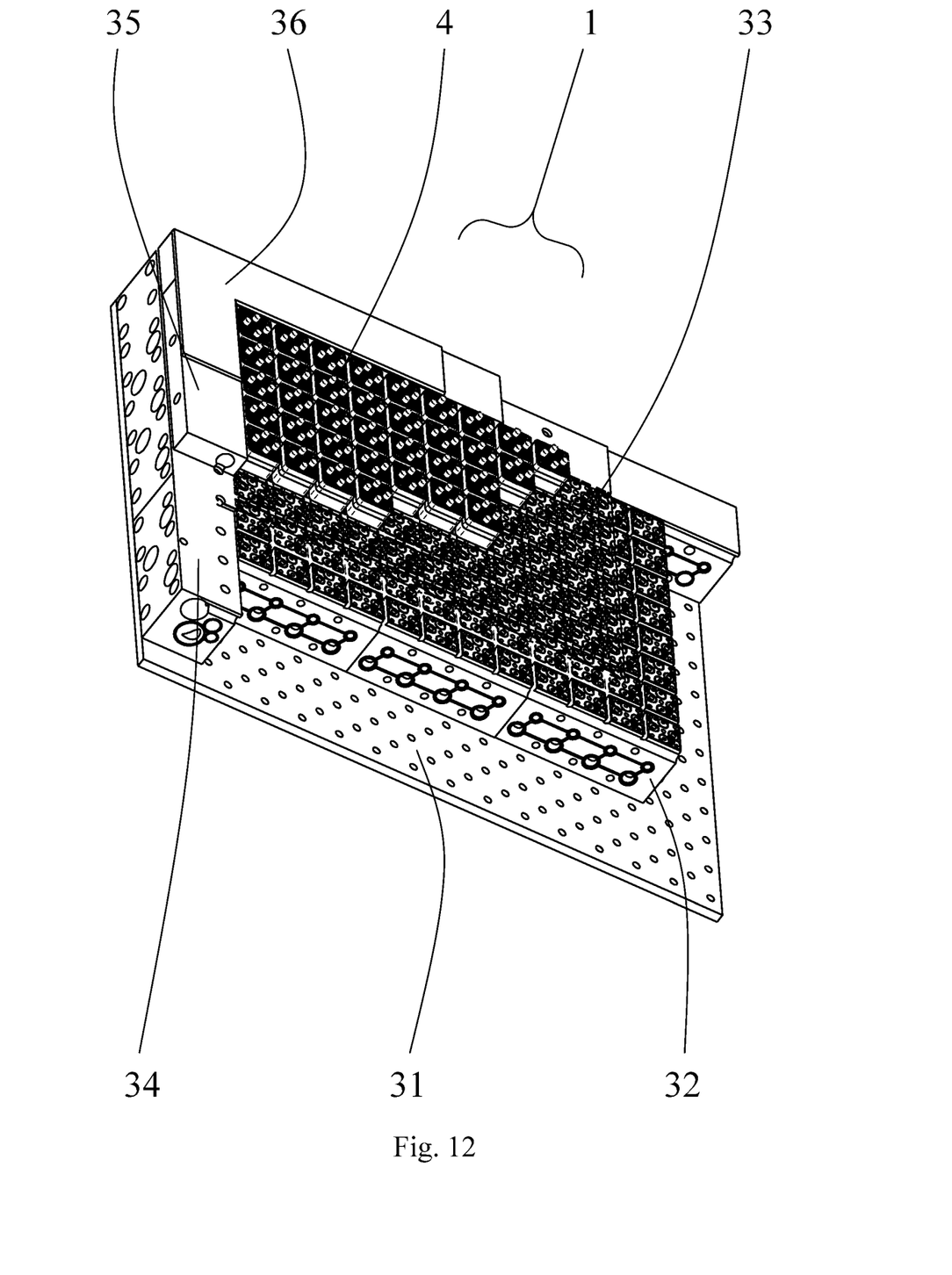
FIG. 12 is the spatial detail view of an assembled dirt stop surface, shown from above.

FIG. 6 shows an assembled valve unit of which the upper surface is constituted by a surface unit 4. The valve unit is adapted for dispensing cleaning fluid, expediently a liquid and preferably water, on a surface to be cleaned when the presence of such a surface is detected above it. The presence of the surface to be cleaned is detected by elements—pins 15—protruding from the surface unit 4 and adapted to get depressed under force. When all pins—in this case, all four pins—are depressed, cleaning fluid, for instance water, is dispensed from the surface area bounded by the pins on the surface to be cleaned that is located directly above the surface unit. The valve unit consists of a base body 10, an intermediate body 21, and an upper body 22 arranged above one another. Water enters the base body 10, shown from above in FIG. 3, through an inlet opening 11, and may flow as far as the middle of the base body 10 in a flow channel 13 along the flow path 28 shown in dashed line in the drawing, and may leave the base body 10 in an upward direction. Valve ducts 14 are disposed in the flow channel 13, with cylindrical pins 15 being arranged in the valve ducts 14. Functioning as valves, the pins 15 may shut off or open the flow channel 13. In FIG. 5 the left pin 15 is in closed position, while the right pin 15 is in open position, because if the groove 17 of the pin 15 is located in the flow channel 13 (otherwise blocked by the intermediate body 21), it frees up the path of the flow. FIG. 6 shows this arrangement in sectional view also showing the stop surfaces 19 adapted for limiting the displacement of the pins 15. The pins 15 are expediently pushed in their upper terminal position by a resilient element that in the embodiment shown in the drawings is implemented as an air spring 40. The pins may be depressed as far as the tread surface 7 under the force exerted on outer end 18 by a shoe sole or a wheel to be cleaned. The valves configured according to FIGS. 5-6 utilising pins 15 are connected in serial connection, implying that the valve unit formed by the valves will be open only when all the valves are in their open position. The underside of the intermediate body 21 is sealedly seated on the base body 10. A flow path 28, shown in dashed lines in FIG. 9, is disposed on the underside of the intermediate body 21. The flow ascends to the underside of the upper body 22 that is sealedly seated on the upper side of the intermediate body (FIG. 9) through an ascending vent 24. FIG. 10 illustrates the underside of the upper body 22, showing the openings 25 adapted for dispensing the cleaning fluid. The openings 25 open on the knurled tread surface 7 forming the upper side of the upper body 22. The above described elements of the valve unit are retained by screws 23 disposed in through holes 27, with a screw disposed in the hole in the middle of the base body 10 being applied only for retaining the base body, and thereby remaining in place when the valve unit is disassembled. The fluid inlets and mechanical support necessary for the operation of the valve unit are provided by base units 32. Spent cleaning fluid, flowing back between surface units 4 (that is, between valve units) may be drained off also utilising the base units 32 that are arranged with spacings between them (FIG. 12). Sufficient rigidity of the assembled dirt stop surface 1 is provided by a foundation plate 31 and a base plate 33 between which the base units 32 are sandwiched. The valve units constituting the surface units 4 are mounted on the base plate 33 such that they are bounded along the sides of the dirt stop surface 1 by upper bounding pieces 35. In a similar manner, the base units 32 are bounded laterally by bottom bounding pieces 34 also providing the inlet and draining of the fluid, and are covered by cover plates 36.

In addition to the above described elements necessary for performing the basic function of the dirt stop assembly, that is, detecting the presence of a surface to be cleaned and dispensing cleaning fluid thereon, the invention is capable of performing other supplementary functions:

Cleaning and/or drying of the surfaces to be cleaned may be performed by means of compressed air blowing. To achieve that, compressed air fed under the pin 15, originally functioning as an air spring 40, is fed through ducts 41, 42 in a buffer space 43 between the base body 10 and the intermediate body 21 whence it flows out at the surface through openings 44. The timing of compressed air blowing may be set by adjusting the relative position of duct 42 and the buffer space 43.

Self-cleaning may be performed by introducing cleaning liquid through one or more inlet openings 45 to the base body 10. The cleaning fluid flows through distribution ducts 46 disposed between the base body 10 and the intermediate body 21, and is fed through outlet ducts 47 to the drain channel disposed between the valve units constituting the surface units 4, from where it may wash off contaminants. In an arrangement comprising air springs, the tread surface 26 may be cleaned at a reduced fluid pressure by depressurizing the air springs.

Figure 8:
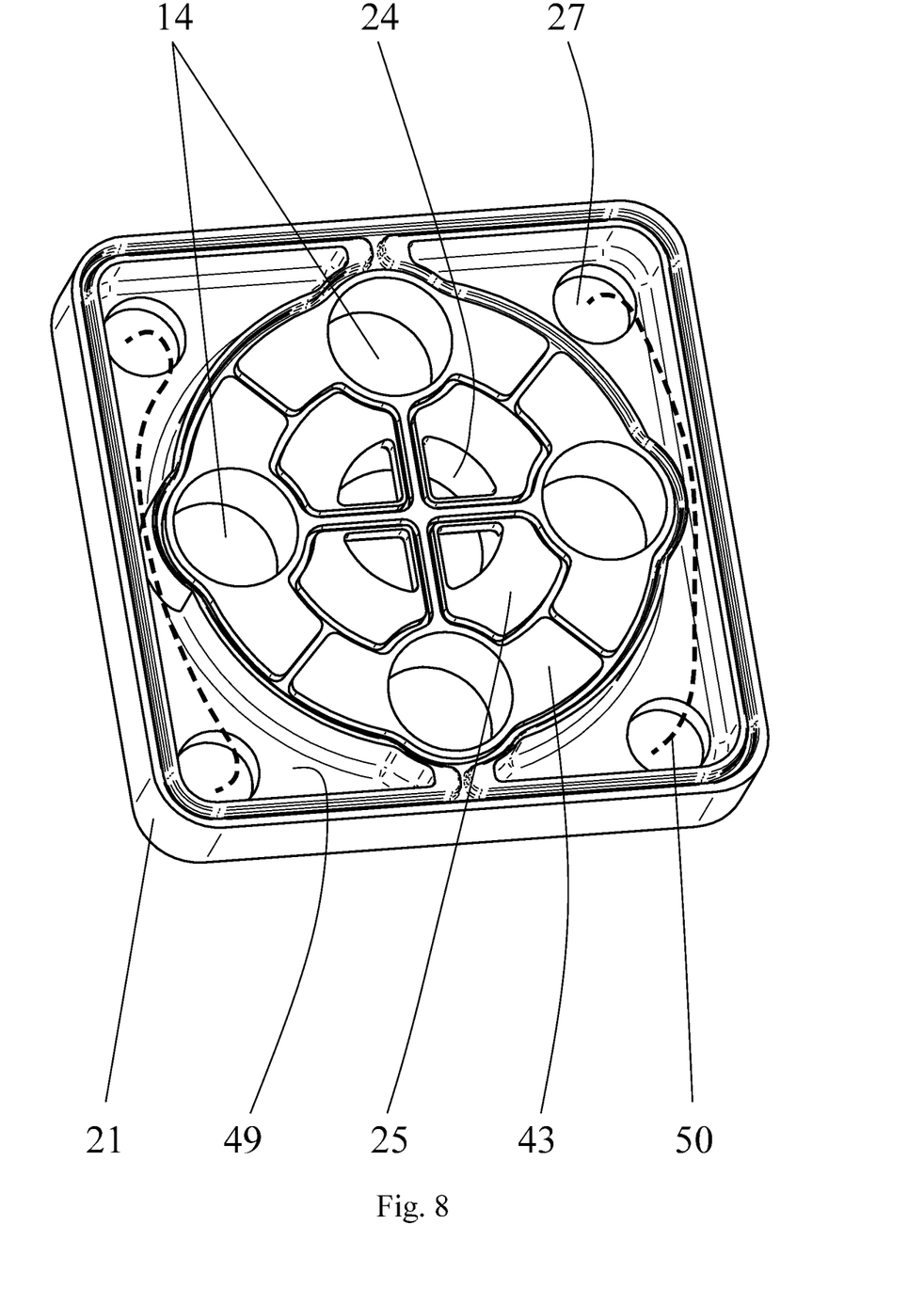
FIG. 8 shows the spatial view of the intermediate body of a surface unit from above.

In case of applications where there is a danger of frost, the assembly may be tempered by for instance introducing tempering liquid along one of the corner screws 23. Following path 50 indicated in FIG. 4 by a dotted line, the tempering liquid flows through flow space 48, flowing alongside the screws 23 through holes 27 into flow space 49 shown in FIG. 8, and then flowing through the other side of the flow space 49 downward to the base body 10 from where it may be drained off.

Figure 13:
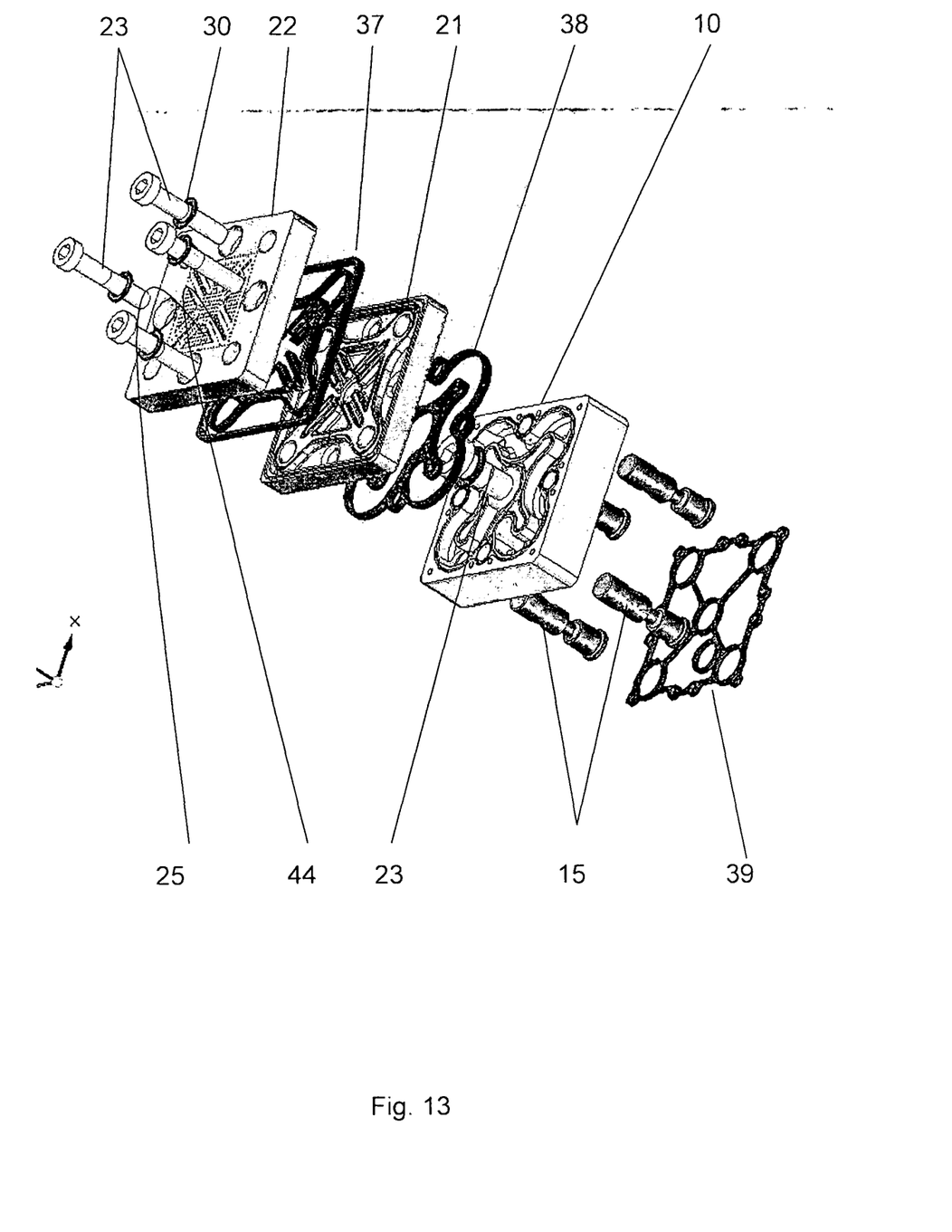
FIG. 13 shows the exploded spatial view of an alternative embodiment of the surface unit.

FIG. 13 shows another conceivable embodiment of the valve units constituting the surface units 4, where a larger surface area may be covered with openings 25 because the pins 15 are arranged in the corners of the surface unit 4. Otherwise the arrangement is similar to the first embodiment described above. The retainer screw arranged in the middle of the base body 10 is also clearly shown in the drawing.

The solution according to the invention, of which the preferred embodiments are defined in the accompanying Claims, is capable of fulfilling the objective of the invention.

Applying basic building blocks (valve groups, valve units, adapter elements, etc.) the cleaning system may be expanded into an automated dirt stop surface of any size and shape.

The utility system (cleaning and rinsing fluid supply, compressed air supply, tempering fluid supply, drain means for spent fluids) and the automated control system adapted for controlling it (controlled valves, active and passive flow control elements, pressure and flow sensors, heating elements, fluid mixers, pumps, etc.), as well as the programmable central unit (microcontroller, PLC) performing system supervision together provide that the apparatus is operated safely, and that the entire cleaning process is carried out in a coordinated and efficient manner.

The high-resolution detection system of the cleaning surface of the apparatus functionally performs a "sampling" of the shape of the surfaces to be cleaned passing over it. Detecting the shape and position of the shoe soles and tires it is capable of controlling the entire cleaning process that is promptly started as the presence of the surface to be cleaned is detected, and is completed in a few seconds applying thorough, active water-based cleaning. The entire surface of the automated dirt stop apparatus is always in stand-by state, ready to perform cleaning action. Cleaning may be performed at any point of the surface of the apparatus with uniform efficiency and speed, but is initiated only at those surface units that are covered by the surfaces to be cleaned, and these units remain activated only as long as the surface to be cleaned is in their immediate proximity. During the cleaning process nothing else but the contacting surfaces get wet.

The automation scheme of the apparatus allows a wide range of possible applications. Advantages of the inventive apparatus include the programmable dispensing of solvents, disinfectants, and perfumes, the capability of cleaning utilising cold, warm, and hot water, a fully automated event-driven operation, effective multi-stage self cleaning (programmable cycles), and optimal water use.

Further advantages are improved environmental compliance through an optionally available water cleaning and recirculation system, energy-saving and safe operation, aesthetically pleasing appearance, simple operation, and exceptionally long service life. The apparatus is highly customisable in a wide range as far as mechanical and chemical endurance are concerned. It may be freely adapted in shape, and is able to dry cleaned surfaces. It may be implemented in portable or stationary form, has low maintenance costs, and in case of any malfunction it may be serviced simply and quickly.

| List of reference numerals | |
|---|---|
| 1 | dirt stop surface |
| 4 | surface unit |
| 6 | wheel |
| 7 | tread surface |
| 10 | base body |
| 11 | inlet opening |
| 13 | flow channel |
| 14 | valve duct |
| 15 | pin |
| 17 | groove |
| 18 | outer end |
| 19 | stop surface |
| 21 | intermediate body |
| 22 | upper body |
| 23 | screw |
| 24 | ascending vent |
| 25 | opening |
| 26 | tread surface |
| 27 | hole |
| 28 | flow path |
| 31 | foundation plate |
| 32 | base unit |
| 33 | base plate |
| 34 | bottom bounding piece |
| 35 | upper bounding piece |
| 36 | cover plate |
| 40 | air spring |
| 41 | duct |
| 42 | duct |
| 43 | buffer space |
| 44 | opening |
| 45 | inlet opening |
| 46 | distribution duct |
| 47 | outlet duct |
| 48 | flow space |
| 49 | flows space |
| 50 | path |

The invention claimed is:

1. A method for operating a dirt stop surface, the method comprising the steps of:
   locating a dirt stop surface at a line dividing clean and contaminated areas, the dirt stop surface comprising a plurality of surface units, each surface unit in the plurality of surface units comprising a plurality of opening-closing valve units;
   dispensing a fluid stream from any opening-closing valve unit in a way, that every single surface unit itself dispenses only:
      when a surface to be cleaned is above the surface unit;
      when the surface to be cleaned covers the surface unit, and
      wherein the surface unit and the surface to be cleaned create contacting surfaces;
   limiting said dispensing such that the fluid stream directly wets the contacting surfaces;
   draining off the fluid from the surface to be cleaned by flow between the plurality of opening-closing valve units;
   providing at least three sensors for each surface unit, each said sensor configured for sensing contact of the surface to be cleaned with the surface unit;
   wherein each surface unit in the plurality of surface units defines one or more openings in an area bounded by straight lines connecting adjacent sensors located closest to an edge of each said surface unit, and
   preventing dispensing the fluid from any valve unit unless contact with the surface to be cleaned is indicated simultaneously by all sensors for any surface unit.

2. The method according to claim 1, further comprising the steps of:
   limiting the sensors provided to mechanical sensors; and
   arranging each valve unit in the plurality of valve units in serial connection to control dispensing the fluid.

3. The method according to claim 2, further comprising the step of limiting each valve unit in the plurality of valve units to a configuration comprising a cylindrical pin adapted to dispense the fluid when the cylindrical pin is displaced into the valve unit by the surface to be cleaned.

4. The method according to claim 3, further comprising the step of providing a resilient element configured to bias each cylindrical pin towards a normal position that protrudes out of an upper surface of the valve unit in the plurality of valve units in which said cylindrical pin is located.

5. The method according to claim 4, further comprising the step of utilizing compressed air as the resilient element.

6. The method according to claim 1, further comprising the step of blowing compressed air on the surface to be cleaned in a manner synchronized with the dispensing of the fluid so as to clean and dry the surface to be cleaned.

7. The method according to claim 1, further comprising the steps of:
   limiting the fluid to water,
   providing a utility system for rinsing the dirt stop surface, wherein the utility system is configured to rinse the surface to be cleaned using the fluid;
   heating the fluid to create heated water; and
   controlling a temperature of the dirt stop surface by circulating the heated water on the dirt stop surface.

8. The method according to claim 1, further comprising the step of utilizing a closed circuit to treat the fluid drained from the surface to be cleaned.

* * * * *